US011330589B2

(12) United States Patent
Xie et al.

(10) Patent No.: US 11,330,589 B2
(45) Date of Patent: May 10, 2022

(54) CARRIER SWITCHING AND INFORMATION SENDING METHOD AND APPARATUS

(71) Applicant: HUAWEI TECHNOLOGIES CO., LTD., Shenzhen (CN)

(72) Inventors: Xinqian Xie, Beijing (CN); Zhiheng Guo, Beijing (CN); Bin Xu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 87 days.

(21) Appl. No.: 16/787,039

(22) Filed: Feb. 11, 2020

(65) Prior Publication Data
US 2020/0187210 A1 Jun. 11, 2020

Related U.S. Application Data

(63) Continuation of application No. PCT/CN2018/097121, filed on Jul. 25, 2018.

(30) Foreign Application Priority Data

Aug. 11, 2017 (CN) .......................... 201710687304.3

(51) Int. Cl.
*H04W 72/04* (2009.01)
*H04W 72/08* (2009.01)
*H04W 74/00* (2009.01)

(52) U.S. Cl.
CPC ... *H04W 72/0453* (2013.01); *H04W 72/0413* (2013.01); *H04W 72/085* (2013.01); *H04W 74/004* (2013.01)

(58) Field of Classification Search
CPC ......... H04W 72/0453; H04W 72/0413; H04W 72/085; H04W 74/004; H04W 72/042;
(Continued)

(56) References Cited

U.S. PATENT DOCUMENTS 10,708,955 B2 * 7/2020 Sun .................. H04W 74/0833
10,973,056 B2 * 4/2021 Jang .................. H04W 72/0453
(Continued)

FOREIGN PATENT DOCUMENTS

| CN | 104253628 A | 12/2014 |
|---|---|---|
| CN | 104811962 A | 7/2015 |

(Continued)

OTHER PUBLICATIONS

Huawei et al.,"Overview of NR UL for LTE-NR coexistence",3GPP TSG RAN WG1 NR Ad Hoc Meeting R1-1709979, Qingdao, China, Jun. 27-30, 2017, Total 12 Pages.
(Continued)

*Primary Examiner* — Brian T O Connor
(74) *Attorney, Agent, or Firm* — Hauptman Ham, LLP

(57) ABSTRACT

In various embodiments, a first carrier and a second carrier occupying different frequencies can be determined by a terminal device. A working state on the first carrier and a working state on the second carrier can be determined by the terminal device as a first working state, and a second working state, respectively. The first working state indicates the terminal device is capable of sending a first signal including at least one of an uplink data signal and an uplink control signal, and the second working state indicates the terminal device is incapable of sending the first signal. First indication information can be received by the terminal device from a network device. Based on the first indication information, the terminal device can determine that the working state on the first carrier is the second working state, and the working state on the second carrier is the first working state.

18 Claims, 6 Drawing Sheets

(58) Field of Classification Search
CPC ............ H04W 74/0833; H04W 72/12; H04W 72/1268; H04W 72/1289; H04W 72/0446; H04W 74/006; H04L 5/001; H04L 5/0098
See application file for complete search history.

(56) References Cited

U.S. PATENT DOCUMENTS

| | | | |
|---|---|---|---|
| 2010/0323694 | A1 | 12/2010 | Altintas |
| 2013/0308543 | A1 | 11/2013 | Cordeiro |
| 2014/0086213 | A1* | 3/2014 | Kwon ............... H04W 56/0045 370/331 |
| 2017/0164383 | A1 | 6/2017 | Seo et al. |
| 2018/0352487 | A1* | 12/2018 | Fan .................... H04W 12/041 |
| 2019/0357264 | A1* | 11/2019 | Yi ........................ H04L 5/001 |
| 2020/0146042 | A1* | 5/2020 | Suzuki ..................... H04L 5/14 |
| 2020/0314895 | A1* | 10/2020 | Bergstrom ........ H04W 74/0808 |
| 2021/0144560 | A1* | 5/2021 | Sesia ................ H04W 72/0453 |

FOREIGN PATENT DOCUMENTS

| | | |
|---|---|---|
| CN | 105263139 A | 1/2016 |
| CN | 106231637 A | 12/2016 |
| EP | 3442300 A1 | 2/2019 |

OTHER PUBLICATIONS

Huawei, HiSilicon, Consideration on LTE-NR co-existence 3GPP TSG-RAN WG3 #NR2 Ad-HocQingdao, China, Jun. 27-29, 2017, R2-1707423, 3 pages.

Chinese Office Action issued in corresponding Chinese Application No. 201710687304.3, dated May 8, 2021, pp. 1-11.

European Office Action issued in corresponding European Application No. 18844623.1, dated Dec. 8, 2021, pp. 1-5, European Patent Office, Rijswijk, Netherlands.

* cited by examiner

CARRIER SWITCHING AND INFORMATION SENDING METHOD AND APPARATUS

CROSS-REFERENCE TO RELATED APPLICATIONS

This application is a continuation of International Application No. PCT/CN2018/097121, filed on Jul. 25, 2018, which claims priority to Chinese Patent Application No. 201710687304.3, filed on Aug. 11, 2017. The disclosures of the aforementioned applications are hereby incorporated by reference in their entireties.

TECHNICAL FIELD

This application relates to the field of communications technologies, and in particular, to a carrier switching and information sending method and apparatus.

BACKGROUND

In the prior art, a network device may configure a plurality of uplink carriers of different frequencies for a terminal device, so that the terminal device performs uplink communication with the network device. Considering factors such as cross modulation interference caused when the terminal device simultaneously sends uplink signals on the plurality of uplink carriers of different frequencies, or a capability limitation of the terminal device, or a transmit power limitation of the terminal device, the terminal device may usually perform uplink communication with the network device by using only one of the plurality of uplink carriers of different frequencies at a time. In addition, a most appropriate uplink carrier used by the terminal device to perform uplink communication varies with factors such as a geographical location, a moving speed, or a channel environment of the terminal device. Therefore, the terminal device needs to switch from a first uplink carrier on which the terminal device currently performs uplink communication with the network device to a more appropriate second uplink carrier, thereby improving uplink communication performance. For example, if the first uplink carrier is of a high frequency, and the second uplink carrier is of a low frequency, an uplink carrier on which the terminal device performs uplink communication with the network device may be switched from the first uplink carrier to the second uplink carrier when channel quality of the first uplink carrier is relatively poor, thereby improving channel quality. However, currently, there is no technical solution to implement switching from the first uplink carrier to the second uplink carrier.

SUMMARY

Various embodiments provide a carrier switching and information sending method and apparatus, to switch an uplink carrier on which a terminal device performs uplink communication with a network device from a first uplink carrier to a second uplink carrier.

To achieve the foregoing objective, various embodiments provide the following technical solutions.

According to a first aspect, a carrier switching method is provided, and the method includes: determining, by a terminal device, a first carrier and a second carrier, where the first carrier and the second carrier are of different frequencies; determining, by the terminal device, that a working state on the first carrier is a first working state, and that a working state on the second carrier is a second working state, where the first working state is that the terminal device is capable of sending a first signal, the second working state is that the terminal device is incapable of sending the first signal, and the first signal includes at least one of an uplink data signal and an uplink control signal; receiving, by the terminal device, first indication information from a network device; and determining, by the terminal device based on the first indication information, that the working state on the first carrier is the second working state, and that the working state on the second carrier is the first working state. According to the method provided in the first aspect, the terminal device may switch, based on the first indication information sent by the network device, the working state on the first carrier from the first working state to the second working state, and switch the working state on the second carrier from the second working state to the first working state. The first working state is that the terminal device is capable of sending the first signal, and the second working state is that the terminal device is incapable of sending the first signal. Therefore, when the first signal needs to be sent, the terminal device needs to select a carrier that supports sending the first signal, for example, makes an adjustment from the first carrier that originally supports sending the first signal to the second carrier to subsequently support sending the first signal, so that the terminal device completes carrier switching. In addition, the terminal device sends the first signal to the network device by using only one uplink carrier at a time, so as to avoid cross modulation interference caused by sending the first signal on a plurality of uplink carriers of different frequencies.

In one example implementation, the determining, by the terminal device, that a working state on the first carrier is a first working state, and that a working state on the second carrier is a second working state includes: receiving, by the terminal device, second indication information from the network device; and determining, by the terminal device based on the second indication information, that the working state on the first carrier is the first working state, and that the working state on the second carrier is the second working state.

In one example implementation, after the determining, by a terminal device, a first carrier and a second carrier, the method further includes: sending, by the terminal device, a random access preamble sequence to the network device on the first carrier.

In one example implementation, the first working state is that the terminal device is capable of sending the first signal and a second signal, the second working state is that the terminal device is capable of sending the second signal but is incapable of sending the first signal, and the second signal includes at least one of a random access preamble sequence and a sounding reference signal. In this possible implementation, the terminal device may simultaneously send signals by using the first carrier and the second carrier. When the terminal device sends the first signal by using the first carrier, if the terminal device needs to send the second signal, the terminal device may send the second signal by using the second carrier. Therefore, working efficiency of the terminal device is higher than that caused when the terminal device sends the first signal and the second signal by using only the first carrier.

In one example implementation, the first indication information includes an index of the first carrier and an index of the second carrier; or the first indication information includes an index of the second carrier; or the first indication information includes an index of the first carrier, the second working state corresponding to the first carrier, an index of the second carrier, and the first working state corresponding to the second carrier.

In one example implementation, the first indication information includes the index of the first carrier, the second working state corresponding to the first carrier, the index of the second carrier, and the first working state corresponding to the second carrier; and the determining, by the terminal device based on the first indication information, that the working state on the first carrier is the second working state, and that the working state on the second carrier is the first working state includes: determining, by the terminal device, that a working state on a carrier corresponding to the index of the first carrier is the second working state, and that a working state on a carrier corresponding to the index of the second carrier is the first working state.

In one example implementation, the first indication information includes the index of the first carrier and the index of the second carrier; and the determining, by the terminal device based on the first indication information, that the working state on the first carrier is the second working state, and that the working state on the second carrier is the first working state includes: determining, by the terminal device, to interchange a working state on a carrier corresponding to the index of the first carrier and a working state on a carrier corresponding to the index of the second carrier. In this possible implementation compared with the previous possible implementation, less information may be used to instruct the terminal device to determine working states on the first carrier and the second carrier, so that a network resource can be saved.

In one example implementation, the first indication information includes the index of the second carrier; and the determining, by the terminal device based on the first indication information, that the working state on the first carrier is the second working state, and that the working state on the second carrier is the first working state includes: determining, by the terminal device, that a working state on a carrier corresponding to the index of the second carrier is the first working state, and that a working state on a carrier other than the carrier corresponding to the index of the second carrier is the second working state. In this possible implementation compared with the previous possible implementation, less information may be used to instruct the terminal device to determine working states on the first carrier and the second carrier, so that a network resource can be saved.

In one example implementation, the first indication information is carried in a MAC CE. In this possible implementation, the first indication information can take effect more quickly than the first indication information carried in RRC signaling, so that an uplink throughput can be prevented from being greatly reduced.

In one example implementation, the second indication information is carried in scheduling information of an RAR, or the second indication information is carried in uplink scheduling information of an RAR.

According to a second aspect, an information sending method is provided, and the method includes: determining, by a network device, a first carrier and a second carrier, where the first carrier and the second carrier are of different frequencies; determining, by the network device, that a working state of a terminal device on the first carrier is a first working state, and that a working state of the terminal device on the second carrier is a second working state, where the first working state is that the terminal device is capable of sending a first signal, the second working state is that the terminal device is incapable of sending the first signal, and the first signal includes at least one of an uplink data signal and an uplink control signal; determining, by the network device, to adjust the working state of the terminal device on the first carrier from the first working state to the second working state, and determining to adjust the working state of the terminal device on the second carrier from the second working state to the first working state; and sending, by the network device, first indication information to the terminal device, where the first indication information is used to indicate that the working state of the terminal device on the first carrier is the second working state, and that the working state of the terminal device on the second carrier is the first working state. According to the method provided in the second aspect, the network device may send the first indication information to the terminal device, so that the terminal device switches the working state on the first carrier from the first working state to the second working state, and switches the working state on the second carrier from the second working state to the first working state. The first working state is that the terminal device is capable of sending the first signal, and the second working state is that the terminal device is incapable of sending the first signal. Therefore, when the first signal needs to be sent, the terminal device needs to select a carrier that supports sending the first signal, for example, makes an adjustment from the first carrier that originally supports sending the first signal to the second carrier to subsequently support sending the first signal, so that the terminal device completes carrier switching. In addition, the terminal device sends the first signal to the network device by using only one uplink carrier at a time, so as to avoid cross modulation interference caused by sending the first signal on a plurality of uplink carriers of different frequencies.

In one example implementation, after the determining, by the network device, that a working state of a terminal device on the first carrier is a first working state, and that a working state of the terminal device on the second carrier is a second working state, and before the determining, by the network device, to adjust the working state of the terminal device on the first carrier from the first working state to the second working state, and determining to adjust the working state of the terminal device on the second carrier from the second working state to the first working state, the method further includes: sending, by the network device, second indication information to the terminal device, where the second indication information is used to indicate that the working state of the terminal device on the first carrier is the first working state, and that the working state of the terminal device on the second carrier is the second working state.

In one example implementation, the determining, by the network device, that a working state of a terminal device on the first carrier is a first working state, and that a working state of the terminal device on the second carrier is a second working state includes: receiving, by the network device, a random access preamble sequence from the terminal device on the first carrier; and determining, by the network device based on the random access preamble sequence, that the working state of the terminal device on the first carrier is the first working state, and that the working state of the terminal device on the second carrier is the second working state.

In one example implementation, the determining, by the network device, to adjust the working state of the terminal device on the first carrier from the first working state to the second working state, and determining to adjust the working state of the terminal device on the second carrier from the second working state to the first working state includes: after determining that power of receiving a third signal of the terminal device on the first carrier is less than a preset threshold, determining, by the network device, to adjust the working state of the terminal device on the first carrier from the first working state to the second working state, and determining to adjust the working state of the terminal device on the second carrier from the second working state to the first working state.

In one example implementation, the first working state is that the terminal device is capable of sending the first signal and a second signal, the second working state is that the terminal device is capable of sending the second signal but is incapable of sending the first signal, and the second signal includes at least one of a random access preamble sequence and a sounding reference signal. In this possible implementation, the terminal device may simultaneously send signals by using the first carrier and the second carrier. When the terminal device sends the first signal by using the first carrier, if the terminal device needs to send the second signal, the terminal device may send the second signal by using the second carrier. Therefore, working efficiency of the terminal device is higher than that caused when the terminal device sends the first signal and the second signal by using only the first carrier.

In one example implementation, the first indication information includes an index of the first carrier and an index of the second carrier; or the first indication information includes an index of the second carrier; or the first indication information includes an index of the first carrier, the second working state corresponding to the first carrier, an index of the second carrier, and the first working state corresponding to the second carrier.

In one example implementation, the first indication information is carried in a MAC CE. In this possible implementation, the first indication information can take effect more quickly than the first indication information carried in RRC signaling, so that an uplink throughput can be prevented from being greatly reduced.

In one example implementation, the second indication information is carried in scheduling information of an RAR, or the second indication information is carried in uplink scheduling information of an RAR.

According to a third aspect, an information sending method is provided, and the method includes: determining, by a network device, first indication information, where the first indication information is used to indicate a first time unit and a second time unit, the first time unit is a time unit that can be used by a terminal device to send an uplink signal to a network device on a first carrier, the second time unit is a time unit that can be used by the terminal device to send the uplink signal to the network device on a second carrier, the first carrier and the second carrier are of different frequencies, and the uplink signal includes at least one of an uplink data signal and an uplink control signal; and sending, by the network device, the first indication information to the terminal device. According to the method provided in the third aspect, the network device sends the first indication information to the terminal device to indicate the first time unit and the second time unit, so that the terminal device may send the uplink signal to the network device on the first carrier by using the first time unit, or send the uplink signal to the network device on the second carrier by using the second time unit, thereby providing a method for switching a carrier on which the terminal device sends the uplink signal. In addition, when the first time unit and the second time unit do not overlap in terms of time, the terminal device sends the uplink signal to the network device by using only one uplink carrier at a time, so as to avoid cross modulation interference caused by sending the uplink signal on a plurality of uplink carriers of different frequencies.

In one example implementation, in the first time unit, a working state of the terminal device on the first carrier is a first working state, and a working state of the terminal device on the second carrier is a second working state; and in the second time unit, the working state of the terminal device on the second carrier is the first working state, and the working state of the terminal device on the first carrier is the second working state. The first working state is that the terminal device is capable of sending the uplink signal, and the second working state is that the terminal device is incapable of sending the uplink signal.

In one example implementation, the first working state is that the terminal device is capable of sending the uplink signal and a second signal, the second working state is that the terminal device is capable of sending the second signal but is incapable of sending the uplink signal, and the second signal includes at least one of a random access preamble sequence and a sounding reference signal.

In one example implementation, the first indication information is carried in a MAC CE. In this possible implementation, the first indication information can take effect more quickly than the first indication information carried in RRC signaling, so that an uplink throughput can be prevented from being greatly reduced.

According to a fourth aspect, an information receiving method is provided, and the method includes: receiving, by a terminal device, first indication information from a network device, where the first indication information is used to indicate a first time unit and a second time unit, the first time unit is a time unit that can be used by the terminal device to send an uplink signal to the network device on a first carrier, the second time unit is a time unit that can be used by the terminal device to send the uplink signal to the network device on a second carrier, the first carrier and the second carrier are of different frequencies, and the uplink signal includes at least one of an uplink data signal and an uplink control signal; and determining, by the terminal device, the first time unit and the second time unit based on the first indication information. According to the method provided in the fourth aspect, the terminal device determines the first time unit and the second time unit by using the first indication information sent by the network device, so that the terminal device may send the uplink signal to the network device on the first carrier by using the first time unit, or send the uplink signal to the network device on the second carrier by using the second time unit, thereby providing a method for switching a carrier on which the terminal device sends the uplink signal. In addition, when the first time unit and the second time unit do not overlap in terms of time, the terminal device sends the uplink signal to the network device by using only one uplink carrier at a time, so as to avoid cross modulation interference caused by sending the uplink signal on a plurality of uplink carriers of different frequencies.

In one example implementation, in the first time unit, a working state of the terminal device on the first carrier is a first working state, and a working state of the terminal device on the second carrier is a second working state; and in the second time unit, the working state of the terminal device on the second carrier is the first working state, and the working state of the terminal device on the first carrier is the second working state. The first working state is that the terminal device is capable of sending the uplink signal, and the second working state is that the terminal device is incapable of sending the uplink signal.

In one example implementation, the first working state is that the terminal device is capable of sending the uplink signal and a second signal, the second working state is that the terminal device is capable of sending the second signal but is incapable of sending the uplink signal, and the second signal includes at least one of a random access preamble sequence and a sounding reference signal.

In one example implementation, the first indication information is carried in a MAC CE. In this possible implementation, the first indication information can take effect more quickly than the first indication information carried in RRC signaling, so that an uplink throughput can be prevented from being greatly reduced.

According to a fifth aspect, a carrier switching apparatus is provided, and the carrier switching apparatus has a function of implementing any method provided in the first aspect. The function may be implemented by using hardware, or may be implemented by hardware executing corresponding software. The hardware or the software includes one or more units corresponding to the foregoing function.

According to a sixth aspect, an information sending apparatus is provided, and the information sending apparatus has a function of implementing any method provided in the second aspect or the third aspect. The function may be implemented by using hardware, or may be implemented by hardware executing corresponding software. The hardware or the software includes one or more units corresponding to the foregoing function.

According to a seventh aspect, an information receiving apparatus is provided, and the information receiving apparatus has a function of implementing any method provided in the fourth aspect. The function may be implemented by using hardware, or may be implemented by hardware executing corresponding software. The hardware or the software includes one or more units corresponding to the foregoing function.

According to an eighth aspect, a carrier switching apparatus is provided, and the apparatus includes a memory and a processor. The memory is configured to store a computer executable instruction, and the processor executes the computer executable instruction stored in the memory, so that the apparatus implements any method provided in the first aspect.

According to a ninth aspect, an information sending apparatus is provided, and the apparatus includes a memory and a processor. The memory is configured to store a computer executable instruction, and the processor executes the computer executable instruction stored in the memory, so that the apparatus implements any method provided in the second aspect or the third aspect.

According to a tenth aspect, an information receiving apparatus is provided, and the apparatus includes a memory and a processor. The memory is configured to store a computer executable instruction, and the processor executes the computer executable instruction stored in the memory, so that the apparatus implements any method provided in the fourth aspect.

According to an eleventh aspect, an apparatus is provided, and the apparatus may exist in a product form of a chip. The apparatus includes a processor, a memory, and a transceiver component. The transceiver component includes an input/output circuit. The memory is configured to store a computer executable instruction. The processor executes the computer executable instruction stored in the memory, to implement any method provided in the first aspect.

According to a twelfth aspect, an apparatus is provided, and the apparatus may exist in a product form of a chip. The apparatus includes a processor, a memory, and a transceiver component. The transceiver component includes an input/output circuit. The memory is configured to store a computer executable instruction. The processor executes the computer executable instruction stored in the memory, to implement any method provided in the second aspect or the third aspect.

According to a thirteenth aspect, an apparatus is provided, and the apparatus may exist in a product form of a chip. The apparatus includes a processor, a memory, and a transceiver component. The transceiver component includes an input/output circuit. The memory is configured to store a computer executable instruction. The processor executes the computer executable instruction stored in the memory, to implement any method provided in the fourth aspect.

According to a fourteenth aspect, a computer readable storage medium is provided, including an instruction. When the instruction runs on a computer, the computer is enabled to perform any method provided in the first aspect.

According to a fifteenth aspect, a computer readable storage medium is provided, including an instruction. When the instruction runs on a computer, the computer is enabled to perform any method provided in the second aspect or the third aspect.

According to a sixteenth aspect, a computer readable storage medium is provided, including an instruction. When the instruction runs on a computer, the computer is enabled to perform any method provided in the fourth aspect.

According to a seventeenth aspect, a computer program product including an instruction is provided. When the instruction runs on a computer, the computer is enabled to perform any method provided in the first aspect.

According to an eighteenth aspect, a computer program product including an instruction is provided. When the instruction runs on a computer, the computer is enabled to perform any method provided in the second aspect or the third aspect.

According to a nineteenth aspect, a computer program product including an instruction is provided. When the instruction runs on a computer, the computer is enabled to perform any method provided in the fourth aspect.

For beneficial effects of any one of the implementations provided in the fifth aspect to the nineteenth aspect, refer to beneficial effects of corresponding implementations in the foregoing methods. Details are not described herein again.

DESCRIPTION OF EMBODIMENTS

The following describes the technical solutions in the various embodiments with reference to the accompanying drawings in the various embodiments. In description of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the descriptions of this application, "a plurality of" means two or more than two.

In an evolution process of a wireless communications system, both a new radio (new radio interface, NR for short) system and a long term evolution (long term evolution, LTE for short) system may be deployed on a frequency band below 6 GHz (hertz). For example, referring to FIG. 1, the LTE system is deployed at a frequency of 1.75 GHz, and the NR system is probably deployed at a frequency of 3.5 GHz. At the frequency, uplink coverage of the NR system cannot match downlink coverage, and consequently an uplink rate of the NR system is limited. Therefore, the NR system may be deployed at a frequency other than the frequency of 3.5 GHz for uplink communication, to enhance the uplink coverage of the NR system. In the various embodiments, an uplink carrier of the NR system deployed at a frequency other than the frequency of 3.5 GHz is referred to as a supplementary uplink (SUL for short) carrier, and an uplink carrier of the NR system deployed at the frequency of 3.5 GHz is referred to as a dedicated NR carrier.

In one embodiment, the SUL carrier may be deployed on a dedicated uplink frequency band, and neither LTE system nor another communications system is deployed on the uplink frequency band.

Figure 1:
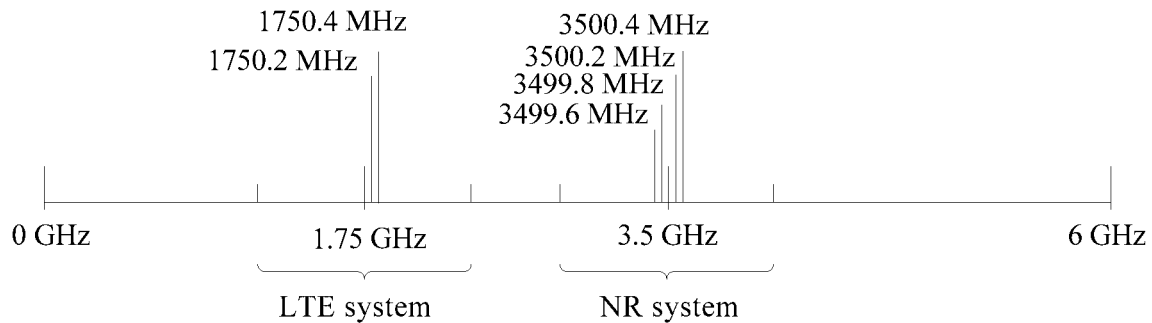
FIG. 1 is a schematic diagram of deployment of a network system on a frequency band according to an embodiment in accordance with the disclosure.
Figure 2:
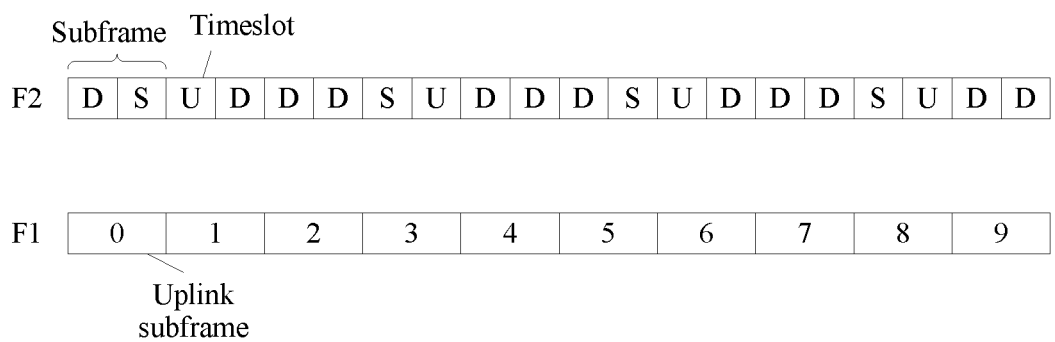
FIG. 2 is a schematic diagram of a time domain resource configuration according to an embodiment in accordance with the disclosure.
Figure 3:
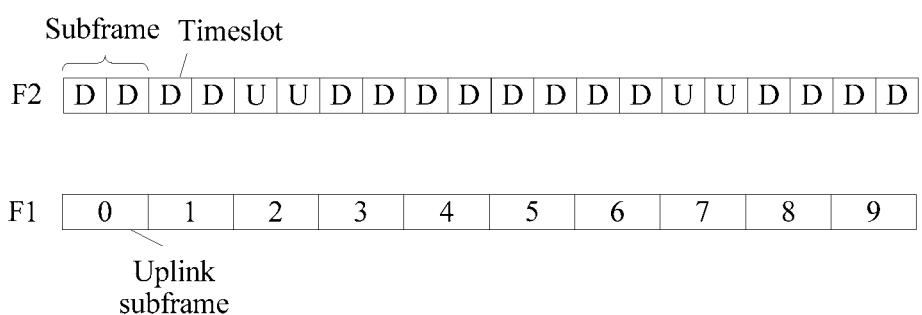
FIG. 3 is a schematic diagram of another time domain resource configuration according to an embodiment in accordance with the disclosure.

In another embodiment, the SUL carrier may be deployed on an uplink frequency band of the LTE system at the frequency of 1.75 GHz. In this case, the LTE system and the NR system coexist on the uplink frequency band of the LTE system. In other words, the NR system and the LTE system share some or all uplink carriers. A terminal device may perform uplink communication with a network device in the NR system by using the dedicated NR carrier or by using the uplink carrier shared between the NR system and the LTE system. The NR system operates in a time division multiplexing (time-division duplex, TDD for short) mode, and the LTE system may operate in a frequency division duplex (frequency division duplexing, FDD for short) mode. For example, referring to FIG. 2 or FIG. 3, a frequency F2 may be 3.5 GHz. When the NR system operates in the TDD mode, one subframe may be divided into two timeslots. In FIG. 2 and FIG. 3, "U" represents an uplink timeslot, and "D" represents a downlink timeslot. In FIG. 2, "S" represents a special timeslot. The special timeslot may be used as an uplink timeslot, or may be used as a downlink timeslot, or may be used as both an uplink timeslot and a downlink timeslot. Referring to FIG. 1, a frequency of an uplink carrier may be 3500.4 MHz (or 3500.2 MHz, or 3499.8 MHz, or 3499.6 MHz), and a frequency F1 may be 1.75 GHz. Therefore, the SUL carrier may be deployed in one or more uplink subframes, and the SUL carrier may be of a frequency of 1750.2 MHz (or 1750.4 MHz).

In this scenario, the terminal device may send an uplink signal on the dedicated NR carrier and the SUL carrier. However, considering implementation problems such as a capability of the terminal device and cross modulation interference, the terminal device may send the uplink signal by using only one of the dedicated NR carrier and the SUL carrier at a time. A frequency of the SUL carrier is usually lower than a frequency of the dedicated NR carrier. Therefore, referring to FIG. 4, uplink coverage of the frequency of the SUL carrier is greater than uplink coverage of the frequency of the dedicated NR carrier. In this case, a terminal device at a cell edge usually sends the uplink signal by using the SUL carrier, and a terminal device at a cell center usually sends the uplink signal by using the dedicated NR carrier. Therefore, when the terminal device moves from the cell edge to the cell center or from the cell center to the cell edge, the terminal device needs to switch an uplink carrier used for sending the uplink signal. The uplink signal may be at least one of an uplink control signal and an uplink data signal.

In various embodiments, the network device serves a cell, and the terminal device communicates with the network device by using a transmission resource (for example, a frequency domain resource or a spectrum resource) used in the cell. The cell may be a cell corresponding to the network device (for example, a base station). The cell may belong to a macro base station, or may belong to a base station corresponding to a small cell. The small cell herein may include a metro cell, a micro cell, a pico cell, a femto cell, or the like.

The terminal device may also be referred to as user equipment (user equipment, UE for short), an access terminal, a subscriber unit, a subscriber station, a mobile station, a mobile console, a remote station, a remote terminal, a mobile device, a user terminal, a terminal, a wireless communications device, a user agent, a user apparatus, or the like. Alternatively, the terminal device may be a station (ST for short) in a wireless local area network (WLAN for short); or may be a cellular phone, a cordless telephone set, a session initiation protocol (SIP for short) phone, a wireless local loop (WLL for short) station, a personal digital assistant (PDA for short) device, a handheld device having a wireless communication function, a computing device or another processing device connected to a wireless modem, a vehicle-mounted device, or a wearable device (or may be referred to as a wearable intelligent device). Alternatively, the terminal device may be a terminal device in a next-generation communications system, for example, a terminal device in 5G; a terminal device in a future evolved public land mobile network (PLMN for short), or a terminal device in the NR system.

Figure 5:
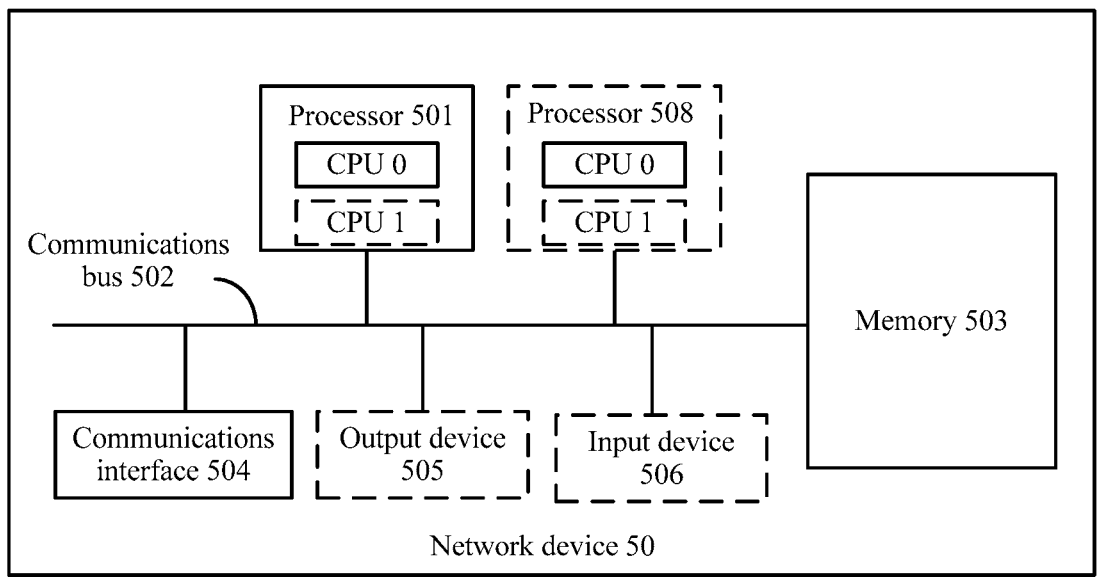
FIG. 5 is a schematic composition diagram of a network device according to an embodiment in accordance with the disclosure.

FIG. 5 is a schematic diagram of a hardware structure of a network device 50 according to an embodiment in accordance with the disclosure. The network device 50 includes at least one processor 501, a communications bus 502, a memory 503, and at least one communications interface 504.

The processor 501 may be a general-purpose central processing unit (CPU for short), a microprocessor, an application-specific integrated circuit (ASIC for short), or one or more integrated circuits configured to control program execution of the solutions in this application.

The communications bus 502 may include a path to transmit information between the foregoing components.

The communications interface 504 may be any apparatus such as a transceiver, and is configured to communicate with another device or a communications network, such as the Ethernet, a radio access network (RAN for short), or a WLAN.

The memory 503 may be a read-only memory (ROM for short) or another type of static storage device that can store static information and an instruction, a random access memory (RAM for short) or another type of dynamic storage device that can store information and an instruction, an electrically erasable programmable read-only memory (electrically erasable programmable read-only memory, EEPROM for short), a compact disc read-only memory (compact disc read-only memory, CD-ROM for short) or another compact disc storage, an optical disc storage (including a compact disc, a laser disc, an optical disc, a digital versatile disc, a Blu-ray disc, or the like), a disk storage medium or another magnetic storage device, or any other medium that can be configured to carry or store expected program code in a form of an instruction or a data structure and that can be accessed by a computer. However, this is not limited thereto. The memory may exist independently, and is connected to the processor by using the bus. Alternatively, the memory may be integrated with the processor.

The memory 503 is configured to store application program code used for executing the solutions of this application, and the processor 501 controls the execution. The processor 501 is configured to execute the application program code stored in the memory 503, to implement a method described below.

During specific implementation, in an embodiment, the processor 501 may include one or more CPUs, for example, a CPU 0 and a CPU 1 in FIG. 5.

During specific implementation, in an embodiment, the network device 50 may include a plurality of processors, for example, the processor 501 and a processor 508 in FIG. 5. Each of the processors may be a single-core (single-CPU) processor, or may be a multi-core (multi-CPU) processor. The processor herein may be one or more devices, circuits, and/or processing cores for processing data (such as a computer program instruction).

During specific implementation, in an embodiment, the network device 50 may further include an output device 505 and an input device 506.

Figure 6:
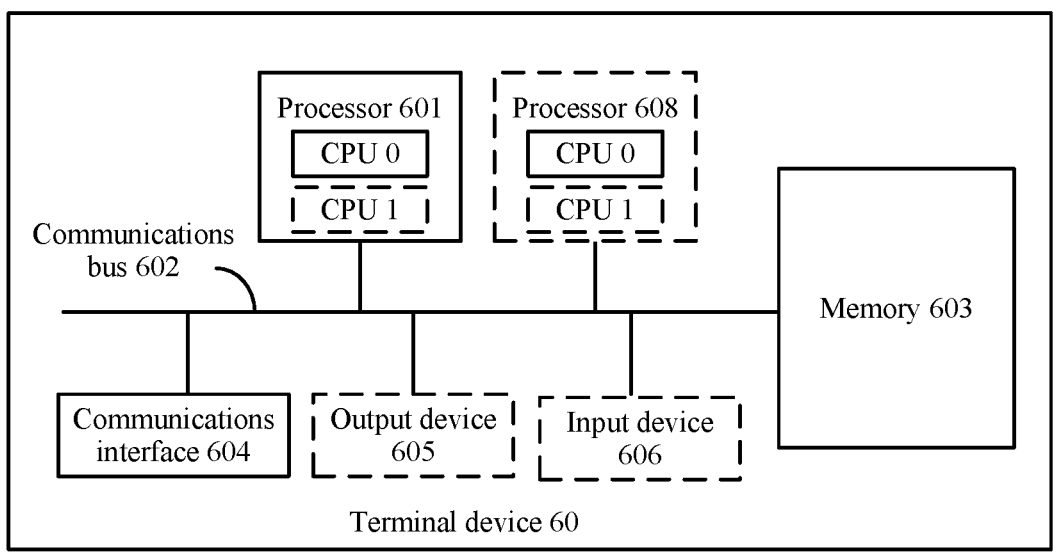
FIG. 6 is a schematic composition diagram of a terminal device according to an embodiment in accordance with the disclosure.

FIG. 6 is a schematic diagram of a hardware structure of a terminal device 60 according to an embodiment in accordance with the disclosure. The terminal device 60 includes at least one processor 601, a communications bus 602, a memory 603, and at least one communications interface 604.

During specific implementation, in an embodiment, the processor 601 may include one or more CPUs, for example, a CPU 0 and a CPU 1 in FIG. 6.

In one embodiment, the terminal device 60 may include a plurality of processors, for example, the processor 601 and a processor 608 in FIG. 6.

In one embodiment, the terminal device 60 may further include an output device 605 and an input device 606.

For functions and other descriptions of the components shown in FIG. 6, refer to the foregoing example descriptions.

Figure 7:
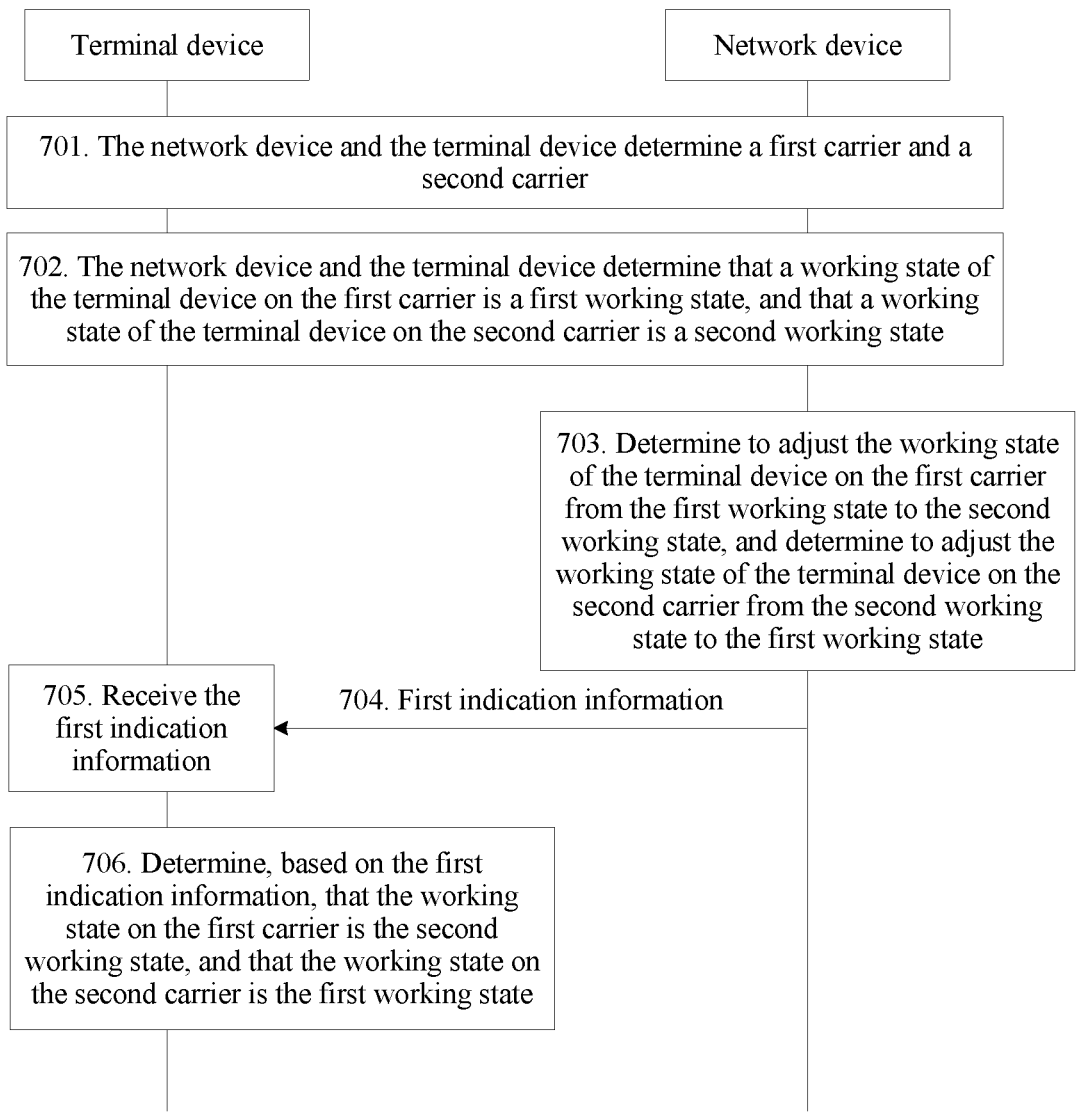
FIG. 7 is an interaction flowchart of a carrier switching and information sending method according to an embodiment in accordance with the disclosure.

One embodiment provides a carrier switching and information sending method. As shown in FIG. 7, the method may include the following steps.

701. A network device and a terminal device determine a first carrier and a second carrier.

The first carrier and the second carrier are of different frequencies. Both the first carrier and the second carrier may be uplink carriers. The network device may configure a plurality of uplink carriers for the terminal device. The plurality of uplink carriers may include a dedicated NR carrier and/or an SUL carrier.

For example, if the first carrier may be a dedicated NR carrier, and the second carrier may be an SUL carrier, the first carrier may be any one of a plurality of dedicated NR carriers, and the second carrier may be any one of a plurality of SUL carriers; or if the first carrier may be an SUL carrier, and the second carrier may be a dedicated NR carrier, the first carrier may be any one of a plurality of SUL carriers, and the second carrier may be any one of a plurality of dedicated NR carriers. It should be noted that, during actual implementation of the method provided in this embodiment in accordance with the disclosure, there may be a plurality of carriers operating in a second working state. In addition to the second carrier, the carrier operating in the second working state may be a dedicated NR carrier, or may be an SUL carrier.

702. The network device and the terminal device determine that a working state of the terminal device on the first carrier is a first working state, and that a working state of the terminal device on the second carrier is a second working state.

The first working state is that the terminal device is capable of sending a first signal, the second working state is that the terminal device is incapable of sending the first signal, and the first signal includes at least one of an uplink data signal and an uplink control signal.

For example, the uplink data signal may be a physical uplink shared channel (PUSCH for short), and the uplink control signal may be a physical uplink control channel (PUCCH for short).

In some embodiments, the first working state is that the terminal device is capable of sending the first signal and a second signal, the second working state is that the terminal device is capable of sending the second signal but is incapable of sending the first signal, and the second signal includes at least one of a random access preamble (preamble) sequence and a sounding reference signal (sounding reference signal, SRS for short).

For example, the terminal device may simultaneously send signals by using the first carrier and the second carrier. When the terminal device sends the first signal by using the first carrier, if the terminal device needs to send the second signal, the terminal device may send the second signal by using the second carrier. Therefore, working efficiency of the terminal device is higher than that caused when the terminal device sends the first signal and the second signal by using only the first carrier.

703. The network device determines to adjust the working state of the terminal device on the first carrier from the first working state to the second working state, and determines to adjust the working state of the terminal device on the second carrier from the second working state to the first working state.

In some embodiments, during specific implementation, step 703 may include the following step: After determining that power of receiving a third signal of the terminal device on the first carrier is less than a preset threshold, the network device determines to adjust the working state of the terminal device on the first carrier from the first working state to the second working state, and determines to adjust the working state of the terminal device on the second carrier from the second working state to the first working state.

The third signal may be a random access preamble sequence, and the preset threshold may be determined based on a current actual network running status.

Figure 4:
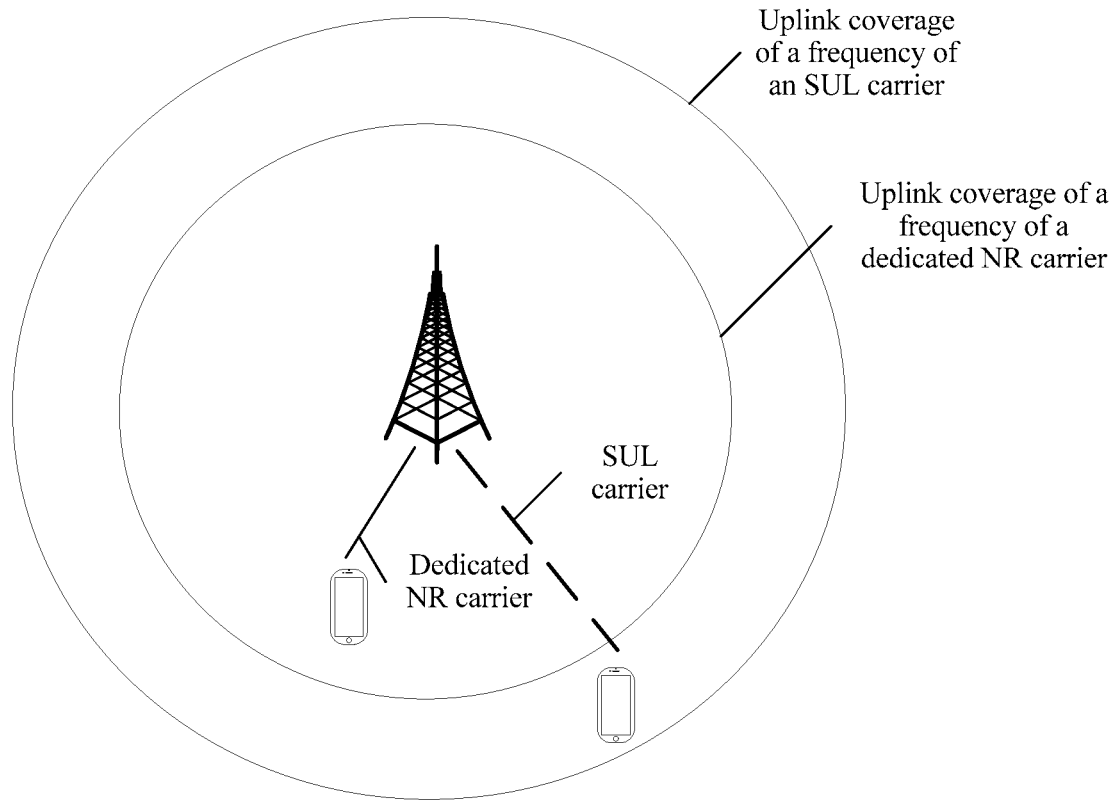
FIG. 4 is a schematic diagram of communication between a base station and a terminal device according to an embodiment in accordance with the disclosure.

For example, referring to FIG. 4, if the first carrier is a dedicated NR carrier, and the second carrier is an SUL carrier, the preset threshold may be power at which the network device receives the third signal of the terminal device on the dedicated NR carrier when the terminal device moves from uplink coverage of a frequency of the dedicated NR carrier to uplink coverage of a frequency of the SUL carrier. A longer distance between the terminal device and the network device indicates smaller power at which the network device receives the third signal of the terminal device. Therefore, in this case, the optional method includes the following step: When the terminal device moves from the uplink coverage of the frequency of the dedicated NR carrier to the uplink coverage of the frequency of the SUL carrier, the network device is triggered to adjust the working state of the terminal device on the first carrier from the first working state to the second working state, and adjust the working state of the terminal device on the second carrier from the second working state to the first working state. After the terminal device leaves the uplink coverage of the frequency of the dedicated NR carrier, the terminal device cannot well communicate with the network device by using the dedicated NR carrier. Therefore, a carrier on which the terminal device performs uplink communication with the network device may be switched from the dedicated NR carrier to the SUL carrier.

In another example, step 703 may include the following step: After determining that power of receiving a third signal of the terminal device on the first carrier is higher than another preset threshold, the network device determines to adjust the working state of the terminal device on the first carrier from the first working state to the second working state, and determines to adjust the working state of the terminal device on the second carrier from the second working state to the first working state.

The another preset threshold herein and the foregoing preset threshold may be a same value, or may be different values determined based on a current actual network running status.

In this case, the first carrier may be an SUL carrier, the second carrier may be a dedicated NR carrier, and the another preset threshold may be power at which the network device receives the third signal of the terminal device on the SUL carrier when the terminal device moves from uplink coverage of a frequency of the SUL carrier to uplink coverage of a frequency of the dedicated NR carrier. In this case, it can be understood that, when the terminal device moves from the uplink coverage of the frequency of the SUL carrier to the uplink coverage of the frequency of the dedicated NR carrier, the network device may be triggered to adjust the working state of the terminal device on the first carrier from the first working state to the second working state, and adjust the working state of the terminal device on the second carrier from the second working state to the first working state.

This is merely example description herein. For some other reasons, the network device may also adjust the working state of the terminal device on the first carrier from the first working state to the second working state, and adjust the working state of the terminal device on the second carrier from the second working state to the first working state. This embodiment in accordance with the disclosure imposes no specific limitation thereto.

704. The network device sends first indication information to the terminal device.

The first indication information is configured to indicate that the working state of the terminal device on the first carrier is the second working state, and that the working state of the terminal device on the second carrier is the first working state.

In some embodiments, the first indication information may be carried in medium access control (MAC for short) signaling. For example, the MAC signaling may be a medium access control control element (MAC CE for short).

705. The terminal device receives the first indication information from the network device.

706. The terminal device determines, based on the first indication information, that the working state on the first carrier is the second working state, and that the working state on the second carrier is the first working state.

According to the method provided in this embodiment, the terminal device may switch, based on the first indication information sent by the network device, the working state on the first carrier from the first working state to the second working state, and switch the working state on the second carrier from the second working state to the first working state. The first working state is that the terminal device is capable of sending the first signal, and the second working state is that the terminal device is incapable of sending the first signal. Therefore, when the first signal needs to be sent, the terminal device needs to select a carrier that supports sending the first signal, for example, makes an adjustment from the first carrier that originally supports sending the first signal to the second carrier to subsequently support sending the first signal, so that the terminal device completes carrier switching. In addition, the terminal device sends the first signal to the network device by using only one uplink carrier at a time, so as to avoid cross modulation interference caused by sending the first signal on a plurality of uplink carriers of different frequencies. Optionally, the first indication information may include any one type of the following information:

Information 1: An index of the first carrier and an index of the second carrier.

In this case, during specific implementation, step 706 may include the following step: The terminal device determines to interchange a working state on a carrier corresponding to the index of the first carrier and a working state on a carrier corresponding to the index of the second carrier.

For example, for the terminal device, the network device configures three carriers: carrier 1, carrier 2, and carrier 3. Carrier 1 is the first carrier, and carrier 2 is the second carrier. For indexes and working states of the three carriers, refer to Table 1.

TABLE 1

| Carrier | Index | Working state |
|---|---|---|
| Carrier 1 (first carrier) | Index 1 | First working state |
| Carrier 2 (second carrier) | Index 2 | Second working state |
| Carrier 3 | Index 3 | Second working state |

If the first indication information includes the index (index 1) of the first carrier and the index (index 2) of the second carrier, after receiving the first indication information, the terminal device interchanges working states on carriers corresponding to index 1 and index 2. Based on an example shown in Table 1, if the first indication information includes index 1 and index 2, after receiving the first indication information, the terminal device interchanges the working state on the first carrier and the working state on the second carrier. For interchanged working states on the carriers, refer to Table 2.

TABLE 2

| Carrier | Index | Working state |
| --- | --- | --- |
| Carrier 1 (first carrier) | Index 1 | Second working state |
| Carrier 2 (second carrier) | Index 2 | First working state |
| Carrier 3 | Index 3 | Second working state |

Information 2: The first indication information includes an index of the second carrier.

In this case, during specific implementation, step 706 may include the following step: The terminal device determines that a working state on a carrier corresponding to the index of the second carrier is the first working state, and that a working state on a carrier other than the carrier corresponding to the index of the second carrier is the second working state.

Based on an example shown in Table 1, if the first indication information includes index 2, after receiving the first indication information, the terminal device determines that the working state on the second carrier is switched from the second working state to the first working state, and that the working states on the carriers (the first carrier and carrier 3) other than the second carrier are the second working states. For a working state of each carrier after step 706 is completed, refer to Table 2.

Information 3: The first indication information includes an index of the first carrier, the second working state corresponding to the first carrier, an index of the second carrier, and the first working state corresponding to the second carrier.

In this case, during specific implementation, step 706 may include the following step: The terminal device determines that a working state on a carrier corresponding to the index of the first carrier is the second working state, and that a working state on a carrier corresponding to the index of the second carrier is the first working state.

Based on an example shown in Table 1, if the first indication information includes information shown in Table 3, after receiving the first indication information, the terminal device determines that the working state on the first carrier (carrier 1) corresponding to index 1 is the second working state, and that the working state on the second carrier (carrier 2) corresponding to index 2 is the first working state. The working state on the remaining carrier does not change. For details, refer to Table 2.

TABLE 3

| Index | Working state |
| --- | --- |
| Index 1 | Second working state |
| Index 2 | First working state |

When the first indication information includes information 1, information used to instruct the terminal device to determine working states on the first carrier and the second carrier may be less than that used when the first indication information includes information 3, so that a network resource can be saved. When the first indication information includes information 2, information used to instruct the terminal device to determine working states on the first carrier and the second carrier may be less than that used when the first indication information includes information 1, so that a network resource can be saved.

In some embodiments, before step 704, the method may further include: sending, by the network device, second indication information to the terminal device, where the second indication information is used to indicate that the working state of the terminal device on the first carrier is the first working state, and that the working state of the terminal device on the second carrier is the second working state. In this case, that the terminal device determines that a working state on the first carrier is a first working state, and that a working state on the second carrier is a second working state includes: receiving, by the terminal device, second indication information from the network device; and determining, by the terminal device based on the second indication information, that the working state on the first carrier is the first working state, and that the working state on the second carrier is the second working state.

In some embodiments, the second indication information may be carried in scheduling information or another message of a random access response (random access response, RAR for short), or the second indication information may be carried in uplink scheduling information (UL grant) or another message of an RAR.

In some embodiments, after the terminal device determines the first carrier and the second carrier, the method may further include: sending, by the terminal device, a random access preamble sequence to the network device on the first carrier. In this case, that the network device determines that a working state of the terminal device on the first carrier is a first working state, and that a working state of the terminal device on the second carrier is a second working state includes: receiving, by the network device, the random access preamble sequence from the terminal device on the first carrier; and determining, by the network device based on the random access preamble sequence, that the working state of the terminal device on the first carrier is the first working state, and that the working state of the terminal device on the second carrier is the second working state.

For example, the network device and the terminal device may determine, in any one of the following manners, that the working state of the terminal device on the first carrier is the first working state, and that the working state of the terminal device on the second carrier is the second working state.

Manner 1: The terminal device first determines that the working state on the first carrier is the first working state, and that the working state on the second carrier is the second working state.

For example, the terminal device may determine a carrier in the first working state according to a preset rule. For example, the terminal device may select, from all available carriers, a carrier of a highest frequency as the carrier in the first working state, or the terminal device may select, from all available carriers, a carrier whose frequency is greater than a preset value as the carrier in the first working state. Certainly, the terminal device may alternatively determine the carrier in the first working state according to another preset rule. This embodiment in accordance with the disclosure imposes no limitation thereto.

It is assumed that the carrier in the first working state is the first carrier. After determining the first carrier, the terminal device may send the random access preamble sequence to the network device by using the first carrier. After receiving information sent by the terminal device by using the first carrier, the network device restores the information on a plurality of carriers configured for the terminal device, and determines that a carrier on which the random access preamble sequence can be restored is the carrier in the first working state. In other words, the network device determines that the working state of the terminal device on the first carrier is the first working state.

It should be noted that, in this embodiment in accordance with the disclosure, an example in which the carrier in the first working state is the first carrier is used to describe the method provided in this embodiment in accordance with the disclosure, but this feature should not be considered as a limitation on this application.

Manner 2: The network device first determines that the working state of the terminal device on the first carrier is the first working state, and that the working state of the terminal device on the second carrier is the second working state.

In one embodiment, the network device may determine a carrier in the first working state according to a preset rule. A determining method may be the same as that of the terminal device. For details, refer to related descriptions in manner 1.

In another embodiment, the network device may determine a carrier in the first working state by using the random access preamble sequence sent by the terminal device. Specifically, the network device may determine that a carrier that is in a plurality of carriers configured for the terminal device and on which the random access preamble sequence can be detected is the carrier in the first working state. For example, the network device determines that a carrier on which the random access preamble sequence sent by the terminal device is detected is a carrier for receiving the uplink control signal of the terminal device. Alternatively, when power of receiving the random access preamble sequence is greater than a preset value, the network device determines that a carrier that is in the plurality of carriers configured for the terminal device and on which the random access preamble sequence can be restored is the carrier in the first working state; otherwise, the network device determines that a carrier, other than the carrier on which the random access preamble sequence can be restored, that is in the plurality of carriers configured for the terminal device is the carrier in the first working state. When there are a plurality of carries other than the carrier on which the random access preamble sequence can be restored, the network device determines that one of the plurality of carries is the carrier in the first working state.

In this case, to enable the terminal device to learn of the carrier in the first working state, the network device needs to send the second indication information to the terminal device.

Optionally, the method may further include: sending, by the network device, third indication information to the terminal device, where the third indication information is used to indicate a backoff value, and the backoff value is used to indicate that the terminal device sends a random preamble sequence after waiting for a period of time; and receiving, by the terminal device, the third indication information sent by the network device. The determining, by the terminal device based on the second indication information, that the working state on the first carrier is the first working state, and that the working state on the second carrier is the second working state includes: determining, by the terminal device after the backoff value based on the second indication information and the third indication information, that the working state on the first carrier is the first working state, and the working state on the second carrier is the second working state.

The second indication information and the third indication information may be included in a same message, or may be included in different messages.

For example, the RAR may include an indicator field. The indicator field indicates the carrier in the first working state, or the indicator field indicates the carrier in the first working state and the backoff value. For example, referring to Table 4, index 0 to index 12 in the indicator field indicate corresponding backoff values, and index 13 and index 14 in the indicator field indicate carriers on which the terminal device is in the first working state.

TABLE 4

| Index | Backoff value (milliseconds) |
|---|---|
| 0 | 0 |
| 1 | 10 |
| 2 | 20 |
| 3 | 30 |
| 4 | 40 |
| 5 | 60 |
| 6 | 80 |
| 7 | 120 |
| 8 | 160 |
| 9 | 240 |
| 10 | 320 |
| 11 | 480 |
| 12 | 960 |
| 13 | First carrier |
| 14 | Second carrier |

Specifically, the indicator field may be carried in a field included in the UL grant of the RAR. Based on an example shown in Table 4, the indicator field may include four bits. Certainly, if the indicator field indicates only the carrier in the first working state, the indicator field may include one or two bits.

An existing carrier aggregation technology supports switching a primary carrier of the terminal device, in other words, supports switching the primary carrier from a first uplink carrier to a second uplink carrier (which is equivalent to handing over the terminal device from a primary cell to a secondary cell). The first uplink carrier and the second uplink carrier may be simultaneously used to send uplink signals. Carrier switching in the carrier aggregation technology includes a change of a parameter at a radio resource control (RRC for short) layer. Therefore, the network device needs to configure the terminal device by using RRC layer signaling, so as to complete switching of the primary carrier of the terminal device. Duration from a moment at which the network device determines the RRC layer signaling to a moment at which the signaling takes effect on the terminal device is relatively long. In addition, uplink data transmission of the terminal device is interrupted during configuration of the RRC layer signaling, and consequently an uplink throughput is greatly reduced.

In a scenario in which the network device configures a plurality of uplink carriers of different frequencies for the terminal device, only one of the first carrier and the second carrier may be used to send the uplink signal at a time. In this scenario, cell handover is not included, and uplink carrier switching includes only a change of a carrier frequency at a physical layer and may not include a change of a parameter at the RRC layer. Certainly, the first indication information may be carried in the RRC layer signaling. It can be learned from the foregoing descriptions that the uplink throughput is greatly reduced due to the RRC layer signaling. Therefore, in this embodiment in accordance with the disclosure, the first indication information is carried in the MAC signaling, so that the uplink throughput can be prevented from being greatly reduced.

It should be noted that, in this embodiment in accordance with the disclosure, the working states on the first carrier and the second carrier are adjusted, so that the terminal device may send the uplink signal by using different carriers before and after adjustment. Therefore, it may also be considered that carrier switching is implemented by using the method provided in this embodiment in accordance with the disclosure.

Figure 8:
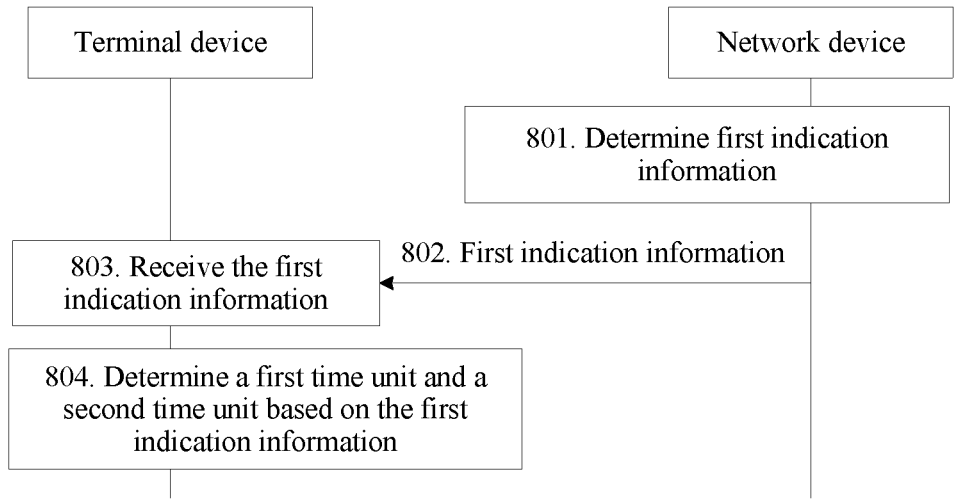
FIG. 8 is an interaction flowchart of an information sending and receiving method according to an embodiment in accordance with the disclosure.

An embodiment in accordance with the disclosure further provides an information sending and receiving method. As shown in FIG. 8, the method may include the following steps.

801. A network device determines first indication information.

The first indication information is used to indicate a first time unit and a second time unit. The first time unit is a time unit that can be used by a terminal device to send an uplink signal to the network device on a first carrier, and the second time unit is a time unit that can be used by the terminal device to send the uplink signal to the network device on a second carrier. The first carrier and the second carrier are of different frequencies, and the uplink signal includes at least one of an uplink data signal and an uplink control signal.

The first time unit (or the second time unit) may be one or more timeslots/subframes. The plurality of timeslots/subframes may be consecutive timeslots/subframes, or may be inconsecutive timeslots/subframes. The first time unit and the second time unit do not overlap in terms of time. Certainly, the first time unit and the second time unit may be other time units. This embodiment in accordance with the disclosure imposes no specific limitation thereto.

Figure 9:
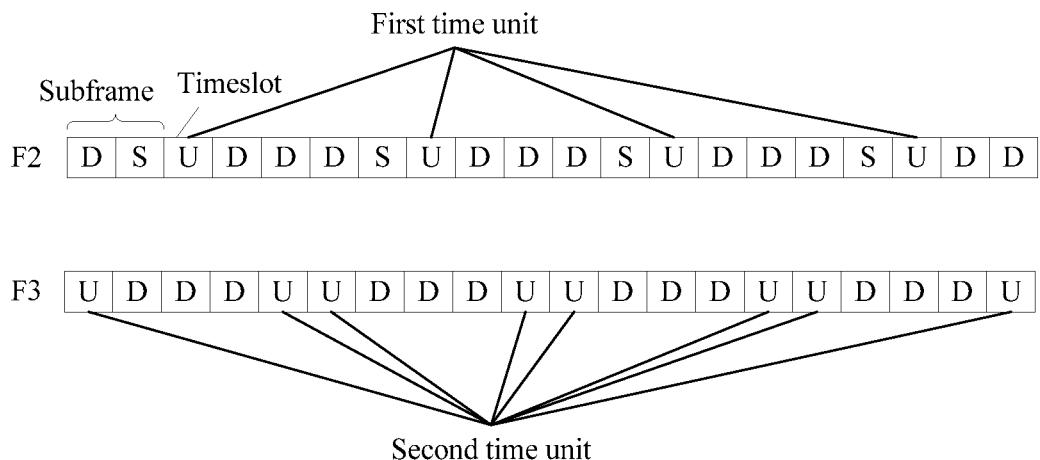
FIG. 9 is a schematic diagram of another time domain resource configuration according to an embodiment in accordance with the disclosure.

For example, referring to FIG. 9, meanings of "U", "D", "S", and "F2" in FIG. 9 are the same as those in FIG. 2, and "F3" is a frequency at which an SUL carrier is deployed. In this case, the first time unit may be an uplink timeslot of a time domain resource of an NR system, and the second time unit may be an uplink timeslot of a time domain resource at the frequency at which the SUL carrier is deployed.

It should be noted that the first time unit or the second time unit may be an empty set. For example, when the second time unit is an empty set, the first indication information instructs the terminal device to send the uplink signal on only the first carrier.

Figure 10:
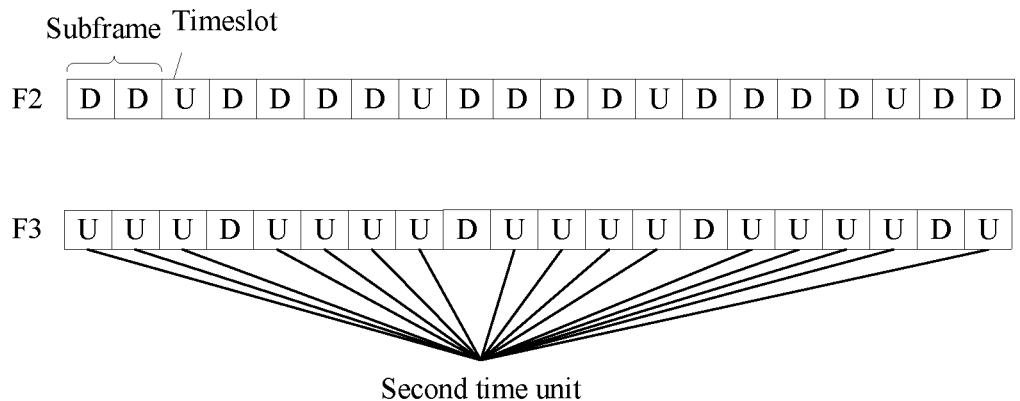
FIG. 10 is a schematic diagram of another time domain resource configuration according to an embodiment in accordance with the disclosure.

For example, referring to FIG. 10, meanings of "U", "D", and "F2" in FIG. 10 are the same as those in FIG. 2, "F3" is a frequency at which an SUL carrier is deployed, the first time unit may be an empty set, and the second time unit may be an uplink timeslot of a time domain resource at the frequency at which the SUL carrier is deployed.

The first indication information may directly indicate a time domain resource used as the first time unit and a time domain resource used as the second time unit.

In this case, the terminal device may be notified of the first indication information in a bitmap form. For example, the first indication information is a field including N (N is an integer greater than 0) bits, and an $n^{th}$ (n is an integer greater than 0 and less than or equal to N) bit in the field corresponds to a subframe in one frame or to a timeslot. When a value of the $n^{th}$ bit is 0, the subframe/timeslot corresponding to the bit belongs to the first time unit. In other words, the terminal device sends the uplink signal on the first carrier in the subframe/timeslot. When a value of the $n^{th}$ bit is 1, the subframe/timeslot corresponding to the bit belongs to the second time unit. In other words, the terminal device sends the uplink signal on the second carrier in the subframe/timeslot.

The first indication information may alternatively indicate a pattern identifier. The network device may determine one pattern in a plurality of patterns, and notify the terminal device of the pattern by using the first indication information. In this case, the plurality of patterns (for example, patterns shown in FIG. 9 and FIG. 10) may be preconfigured for the terminal device. One pattern is used to indicate one combination of the first time unit and the second time unit. The terminal device determines the pattern by using the pattern identifier in the first indication information, and determines the first time unit and the second time unit based on the determined pattern.

Two of the plurality of patterns, in other words, a first pattern and a second pattern, may have overlapping time units. For example, in the first pattern, subframe 0 and subframe 1 belong to the first time unit, and subframe 2 belongs to the second time unit; and in the second pattern, subframe 0 belongs to the first time unit, and subframe 1 and subframe 2 belong to the second time unit. In this case, subframe 0 and subframe 2 are overlapping time units in the first pattern and the second pattern. When the second carrier is a carrier shared by an LTE system and the NR system, a network device in the NR system may interact with a network device in the LTE system by using a backhaul or an Xn interface, to determine the pattern identifier included in the first indication information; or certainly, a network device in the NR system may interact with a network device in the LTE system in another manner to determine the pattern identifier included in the first indication information.

Certainly, the first indication information may be in another form. For example, the first indication information carries one or more element groups (X, Y), where X represents a number of a subframe in one frame or of a timeslot, and Y represents a number of a carrier. In other words, (X, Y) may be understood as that the terminal device is capable of sending the uplink signal on the carrier numbered Y in the subframe/timeslot numbered X. For example, if the first carrier is numbered 0, and the second carrier is numbered 1, (0, 0) may be understood as that the first carrier on timeslot 0 is a carrier that can be used by the terminal device to send the uplink signal, and (1, 1) may be understood as that the second carrier on timeslot 1 is a carrier that can be used by the terminal device to send the uplink signal.

It should be understood that the first time unit and the second time unit are time units that can be used by the terminal device to send the uplink signal, and the terminal device does not need to actually send the uplink signal on an indicated time unit.

802. The network device sends the first indication information to the terminal device.

For example, the first indication information may be semi-static configuration information, and may be carried in RRC layer signaling or MAC layer signaling.

It should be noted that, when the uplink signal includes an uplink control signal and an uplink data signal, the network device may send two pieces of first indication information. One piece of first indication information is used to indicate a time unit related to the uplink control signal, and the other piece of first indication information is used to indicate a time unit related to the uplink data signal. In other words, time units used by the terminal device to respectively send the uplink control signal and the uplink data signal are configured. In this case, a first time unit (or a second time unit) of the uplink control signal indicated by the one piece of first indication information may be different from or may be the same as a first time unit (or a second time unit) of the uplink data signal indicated by the other piece of first indication information. Certainly, the network device may alternatively send only one piece of first indication information, and both time units used by the terminal device to send the uplink control signal and the uplink data signal are configured in the first indication information.

In another case, the network device may separately configure the first time unit and the second time unit. For example, the network device may send two pieces of first indication information. One piece of first indication information is used to indicate the first time unit, and the other piece of first indication information is used to indicate the second time unit.

It is assumed that a plurality of patterns are configured for the terminal device. When the network device configures different patterns for the uplink data signal and the uplink control signal of the terminal device, if a carrier that can be used to send the uplink data signal and a carrier that can be used to send the uplink control signal are different in a same timeslot/subframe, the terminal device selects the carrier that can be used to send the uplink data signal, to send the uplink signal; or certainly the terminal device may select that carrier that can be used to send the uplink control signal, to send the uplink signal.

803. The terminal device receives the first indication information from the network device.

804. The terminal device determines the first time unit and the second time unit based on the first indication information.

After step 804, the terminal device may send the uplink signal to the network device on the first carrier by using the first time unit, or send the uplink signal to the network device on the second carrier by using the second time unit.

According to the method provided in this embodiment in accordance with the disclosure, the network device sends the first indication information to the terminal device to indicate the first time unit and the second time unit, so that the terminal device may send the uplink signal to the network device on the first carrier by using the first time unit, or send the uplink signal to the network device on the second carrier by using the second time unit, thereby providing a method for switching a carrier on which the terminal device sends the uplink signal. In addition, when the first time unit and the second time unit do not overlap in terms of time, the terminal device sends the uplink signal to the network device by using only one uplink carrier at a time, so as to avoid cross modulation interference caused by sending the uplink signal on a plurality of uplink carriers of different frequencies.

In some embodiments, in the first time unit, a working state of the terminal device on the first carrier is a first working state, and a working state of the terminal device on the second carrier is a second working state; and in the second time unit, the working state of the terminal device on the second carrier is the first working state, and the working state of the terminal device on the first carrier is the second working state. The first working state is that the terminal device is capable of sending the uplink signal, and the second working state is that the terminal device is incapable of sending the uplink signal.

For example, the uplink data signal may be a PUSCH, and the uplink control signal may be a PUCCH.

According to this optional method, the terminal device may determine working states on the first carrier and the second carrier by using the first time unit and the second time unit, and send the uplink signal on the first carrier or the second carrier based on the working states.

In some embodiments, the first working state is that the terminal device is capable of sending the uplink signal and a second signal, the second working state is that the terminal device is capable of sending the second signal but is incapable of sending the uplink signal, and the second signal includes at least one of a random access preamble sequence and a sounding reference signal.

For example, the terminal device may simultaneously send signals by using the first carrier and the second carrier. When the terminal device sends the uplink signal by using the first carrier, if the terminal device needs to send the second signal, the terminal device may send the second signal by using the second carrier. Therefore, working efficiency of the terminal device is higher than that caused when the terminal device sends the uplink signal and the second signal by using only the first carrier.

In some embodiments, the first indication information is carried in a MAC CE. In this possible implementation, the first indication information can take effect more quickly than the first indication information carried in RRC signaling, so that an uplink throughput can be prevented from being greatly reduced.

The solutions of the various embodiments are mainly described above from a perspective of interaction between network elements. It can be understood that, to implement the foregoing functions, the information sending apparatus, the information receiving apparatus, and the carrier switching apparatus include corresponding hardware structures and/or software modules for performing the functions. A person of ordinary skill in the art should easily be aware that, in combination with the examples described in the embodiments disclosed in this specification, units and algorithms steps can be implemented by hardware or a combination of hardware and computer software. Whether a specific function is performed by hardware or hardware driven by computer software depends on particular applications and design constraints of the technical solutions. A person skilled in the art may use a different method to implement the described functions for each particular application, but it should not be considered that the implementation goes beyond the scope of this application.

In various embodiments, the information sending apparatus, the information receiving apparatus, and the carrier switching apparatus may be divided into functional units based on the foregoing method examples. For example, each functional unit may be obtained through division based on each corresponding function, or two or more functions may be integrated into one processing unit. The integrated unit may be implemented in a form of hardware, or may be implemented in a form of a software functional unit. It should be noted that unit division in the various embodiments is an example, and is merely logical function division and may be other division during actual implementation.

Figure 11:
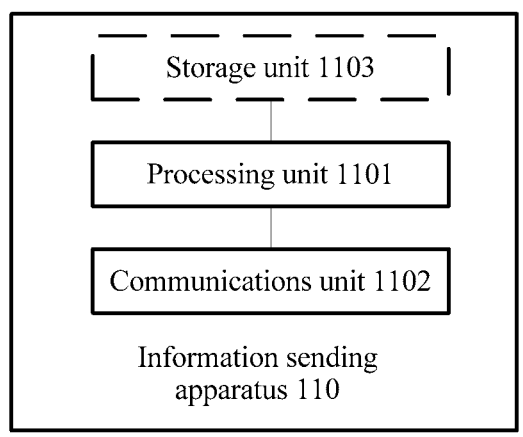
FIG. 11 is a schematic composition diagram of an information sending apparatus according to an embodiment in accordance with the disclosure.

When an integrated unit is used, FIG. 11 is an schematic structural diagram of an information sending apparatus 110 in the foregoing embodiment. The information sending apparatus 110 includes a processing unit 1101 and a communications unit 1102, and may further include a storage unit 1103. The processing unit 1101 is configured to control and manage an action of the information sending apparatus 110. For example, the processing unit 1101 is configured to support the information sending apparatus 110 in performing process 701 to process 704 in FIG. 7 and/or an action performed by the information sending apparatus in another process described in the various embodiments, or the processing unit 1101 is configured to support the information sending apparatus 110 in performing process 801 and process 802 in FIG. 8 and/or an action performed by the information sending apparatus in another process described in the various embodiments. The communications unit 1102 is configured to support the information sending apparatus in communicating with another network entity, for example, the terminal device shown in FIG. 7 or FIG. 8. The storage unit 1103 is configured to store program code and data of the information sending apparatus.

The processing unit 1101 may be a processor or a controller. The communications unit 1102 may be a communications interface, a transceiver, a transceiver circuit, or the like. The communications interface is a general term, and may include one or more interfaces. The storage unit 1103 may be a memory. When the processing unit 1101 is a processor, the communications unit 1102 is a communications interface, and the storage unit 1103 is a memory, the information sending apparatus in this embodiment in accordance with the disclosure may be the network device shown in FIG. 5. The processor 501 controls and manages an action of the network device 50. For example, the processor 501 is configured to support the network device 50 in performing process 701 to process 704 in FIG. 7 and/or an action performed by the network device 50 in another process described in the various embodiments, or the processing unit 1101 is configured to support the network device 50 in performing process 801 and process 802 in FIG. 8 and/or an action performed by the network device 50 in another process described in the various embodiments.

Figure 12:
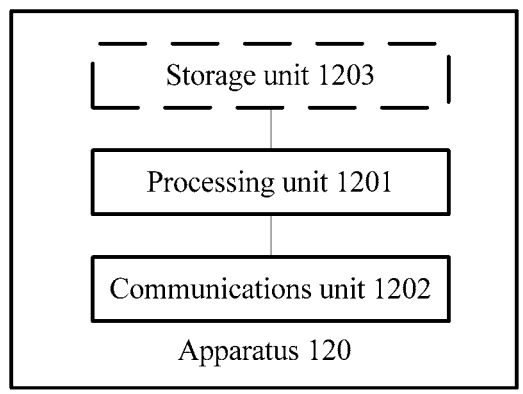
FIG. 12 is a schematic composition diagram of an apparatus according to an embodiment in accordance with the disclosure.

When an integrated unit is used, FIG. 12 is a possible schematic structural diagram of an apparatus 120 in the foregoing embodiment. The apparatus may be a carrier switching apparatus or an information receiving apparatus. Referring to FIG. 12, the apparatus 120 includes a processing unit 1201 and a communications unit 1202. The processing unit 1201 is configured to control and manage an action of the apparatus 120. For example, when the apparatus is the carrier switching apparatus, the processing unit 1201 is configured to support the apparatus 120 in performing process 701, process 702, process 705, and process 706 in FIG. 7 and/or an action performed by the apparatus 120 in another process described in the various embodiments; or when the apparatus is the information receiving apparatus, the processing unit 1201 is configured to support the apparatus 120 in performing process 803 and process 804 in FIG. 8 and/or an action performed by the apparatus 120 in another process described in the various embodiments. The communications unit 1202 is configured to support the apparatus 120 in communicating with another network device. Referring to FIG. 12, the apparatus 120 may further include a storage unit 1203, configured to store program code and data of the apparatus 120.

The processing unit 1201 may be a processor or a controller. The communications unit 1202 may be a communications interface, a transceiver, a transceiver circuit, or the like. The communications interface is a general term, and may include one or more interfaces. The storage unit 1203 may be a memory. When the processing unit 1201 is a processor, the communications unit 1202 is a communications interface, and the storage unit 1203 is a memory, the apparatus 120 in this embodiment in accordance with the disclosure may be the terminal device shown in FIG. 6. The processor 601 is configured to control and manage an action of the terminal device 60. For example, when the carrier switching apparatus is a terminal device, the processor 601 is configured to support the terminal device 60 in performing process 701, process 702, process 705, and process 706 in FIG. 7 and/or an action performed by the terminal device 60 in another process described in the various embodiments; or when the information receiving apparatus is a terminal device, the processor unit 601 is configured to support the terminal device 60 in performing process 803 and process 804 in FIG. 8 and/or an action performed by the terminal device 60 in another process described in the various embodiments.

An embodiment in accordance with the disclosure further provides a computer readable storage medium, including an instruction. When the instruction runs on a computer, the computer is enabled to perform the foregoing methods.

An embodiment in accordance with the disclosure further provides a computer program product including an instruction. When the instruction runs on a computer, the computer is enabled to perform the foregoing methods.

An embodiment in accordance with the disclosure further provides an apparatus, and the apparatus exists in a product form of a chip. The apparatus includes a processor, a memory, and a transceiver component. The transceiver component includes an input/output circuit. The memory is configured to store a computer executable instruction. The processor executes the computer executable instruction stored in the memory, to implement the foregoing methods.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer program instructions are loaded and executed on a computer, the procedures or functions according to the various embodiments are all or partially generated. The computer may be a general-purpose computer, a dedicated computer, a computer network, or another programmable apparatus. The computer instructions may be stored in a computer readable storage medium, or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL for short)) or wireless (for example, infrared, radio, or microwave) manner. The computer readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (solid state disk, SSD for short)), or the like.

Although present disclosure is provided with reference to the embodiments, in a process of implementing this application that claims protection, a person skilled in the art may understand and implement another variation of the disclosed embodiments by viewing the accompanying drawings, disclosed content, and the accompanying claims. In the claims, "including" (including) does not exclude another component or another step, and "a" or "one" does not exclude a case of a plurality of A single processor or another unit may implement several functions enumerated in the claims. Some measures are recorded in dependent claims that are different from each other, but this does not mean that these measures cannot be combined to produce a better effect.

Although present disclosure is provided with reference to features and the embodiments thereof, obviously, various modifications and combinations may be made to them without departing from the spirit and scope of this application. Correspondingly, the specification and accompanying drawings are merely example description of this application defined by the accompanying claims, and is considered as any of or all modifications, variations, combinations or equivalents that cover the scope of this application. Obviously, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A carrier switching method, wherein the method comprises:
   determining, by a terminal device, a first carrier and a second carrier, wherein the first carrier and the second carrier occupy different frequencies;
   determining, by the terminal device, whether a working state on the first carrier is a first working state, and whether a working state on the second carrier is a second working state, wherein the first working state is that the terminal device is capable of sending a first signal, the second working state is that the terminal device is incapable of sending the first signal, the first signal comprising at least one of an uplink data signal or an uplink control signal;
   transmitting, by the terminal device, a signal comprising a random access preamble sequence to a network device on the first carrier;
   receiving, by the terminal device, first indication information from the network device, wherein the first indication information is based on a comparison between a threshold and a power of the signal comprising the random access preamble sequence transmitted from the terminal device on the first carrier; and
   determining, by the terminal device, based on the first indication information, whether to set the working state on the first carrier to the second working state, and whether to set the working state on the second carrier to the first working state.

2. The method according to claim 1, wherein determining, by the terminal device, whether the working state on the first carrier is a first working state, and whether the working state on the second carrier is a second working state comprises:
   receiving, by the terminal device, second indication information from the network device; and
   determining, by the terminal device, based on the second indication information, whether to set the working state on the first carrier to the first working state, and whether to set the working state on the second carrier to the second working state.

3. The method according to claim 2, wherein the second indication information is carried in scheduling information of a random access response (RAR), or the second indication information is carried in uplink scheduling information of an RAR.

4. The method according to claim 1, wherein the first working state is that the terminal device is capable of sending the first signal and a second signal, the second working state is that the terminal device is capable of sending the second signal but is incapable of sending the first signal, and the second signal comprises at least one of a random access preamble sequence or a sounding reference signal.

5. The method according to claim 1, wherein
   the first indication information comprises an index of the first carrier and an index of the second carrier; or
   the first indication information comprises an index of the second carrier; or
   the first indication information comprises an index of the first carrier, the second working state corresponding to the first carrier, an index of the second carrier, and the first working state corresponding to the second carrier.

6. The method according to claim 1, wherein the first indication information is carried in a medium access control element (MAC CE).

7. A carrier switching apparatus, wherein the apparatus comprises a processing unit and a transceiver unit;
   the processing unit is configured to:
      determine a first carrier and a second carrier, wherein the first carrier and the second carrier occupy different frequencies; and
      determine whether a working state on the first carrier is a first working state, and whether a working state on the second carrier is a second working state, wherein the first working state is that the apparatus is capable of sending a first signal, the second working state is that the apparatus is incapable of sending the first signal, and the first signal comprises at least one of an uplink data signal or an uplink control signal;
      transmit a signal comprising a random access preamble sequence to a network device on the first carrier by using the transceiver unit;
      receive first indication information from the network device by using the transceiver unit, wherein the first indication information is based on a comparison between a threshold and a power of the signal comprising the random access preamble sequence to the network device on the first carrier; and
      determine, based on the first indication information, whether to set the working state on the first carrier to the second working state, and whether to set the working state on the second carrier to the first working state.

8. The apparatus according to claim 7, wherein the processing unit is configured to:
   receive second indication information from the network device by using the transceiver unit; and
   determine, based on the second indication information, whether to set the working state on the first carrier to the first working state, and whether to set the working state on the second carrier to the second working state.

9. The apparatus according to claim 8, wherein the second indication information is carried in scheduling information of a random access response (RAR), or the second indication information is carried in uplink scheduling information of an RAR.

10. The apparatus to claim 7, wherein the first working state is that the terminal device is capable of sending the first signal and a second signal, the second working state is that the terminal device is capable of sending the second signal but is incapable of sending the first signal, and the second signal comprises at least one of a random access preamble sequence or a sounding reference signal.

11. The apparatus according to claim 7, wherein
the first indication information comprises an index of the first carrier and an index of the second carrier; or
the first indication information comprises an index of the second carrier; or
the first indication information comprises an index of the first carrier, the second working state corresponding to the first carrier, an index of the second carrier, and the first working state corresponding to the second carrier.

12. The apparatus according to claim 7, wherein the first indication information is carried in a medium access control element (MAC CE).

13. An information sending apparatus, wherein the apparatus comprises a processing unit and a transceiver unit;
the processing unit is configured to:
determine a first carrier and a second carrier, wherein the first carrier and the second carrier are of different frequencies;
determine whether a working state of a terminal device on the first carrier is a first working state, and whether a working state of the terminal device on the second carrier is a second working state, wherein the first working state is that the terminal device is capable of sending a first signal, the second working state is that the terminal device is incapable of sending the first signal, and the first signal comprises at least one of an uplink data signal or an uplink control signal; and
determine whether to adjust the working state of the terminal device on the first carrier from the first working state to the second working state based on a comparison between a threshold and a power of a signal received from the terminal device on the first carrier, and determine whether to adjust the working state of the terminal device on the second carrier from the second working state to the first working state based on the comparison between the threshold and the power of the signal received from the terminal device on the first carrier; and
send first indication information to the terminal device by using the transceiver unit, wherein the first indication information is configured to indicate whether to set the working state of the terminal device on the first carrier to the second working state, and whether to set the working state of the terminal device on the second carrier to the first working state,
wherein the signal received from the terminal device on the first carrier comprises a random access preamble sequence.

14. The apparatus according to claim 13, wherein
the processing unit is further configured to send second indication information to the terminal device by using the transceiver unit, wherein the second indication information indicates whether the working state of the terminal device on the first carrier is the first working state, and whether the working state of the terminal device on the second carrier is the second working state.

15. The apparatus according to claim 13, wherein the processing unit is configured to:
receive the signal comprising the random access preamble sequence from the terminal device on the first carrier by using the transceiver unit; and
determine, based on the random access preamble sequence, whether to instruct the terminal device to set the working state of the terminal device on the first carrier to the first working state, and whether to instruct the terminal device to set the working state of the terminal device on the second carrier to the second working state.

16. The apparatus according to claim 13, wherein
the processing unit is configured to: in response to a determination that power of receiving the signal of the terminal device on the first carrier is less than a preset threshold, determine to adjust the working state of the terminal device on the first carrier from the first working state to the second working state, and determine to adjust the working state of the terminal device on the second carrier from the second working state to the first working state.

17. The apparatus to claim 13, wherein the first working state is that the terminal device is capable of sending the first signal and a second signal, the second working state is that the terminal device is capable of sending the second signal but is incapable of sending the first signal, and the second signal comprises at least one of a random access preamble sequence or a sounding reference signal.

18. The apparatus according to claim 13, wherein
the first indication information comprises an index of the first carrier and an index of the second carrier; or
the first indication information comprises an index of the second carrier; or
the first indication information comprises an index of the first carrier, the second working state corresponding to the first carrier, an index of the second carrier, and the first working state corresponding to the second carrier.

\* \* \* \* \*